United States Patent
Meyer et al.

(10) Patent No.: US 9,026,305 B2
(45) Date of Patent: May 5, 2015

(54) SYSTEM AND METHOD FOR WHEEL ASSEMBLY ACOUSTICAL EVALUATION

(71) Applicant: Hunter Engineering Company, St. Louis, MO (US)

(72) Inventors: Gregory F. Meyer, St. Louis, MO (US); Joel Clasquin, Highland, IL (US); Timothy A. Strege, Sunset Hills, MO (US)

(73) Assignee: Hunter Engineering Company, St. Louis, MO (US)

( * ) Notice: Subject to any disclaimer, the term of this patent is extended or adjusted under 35 U.S.C. 154(b) by 0 days.

(21) Appl. No.: 13/946,043

(22) Filed: Jul. 19, 2013

(65) Prior Publication Data
US 2014/0025251 A1   Jan. 23, 2014

Related U.S. Application Data

(60) Provisional application No. 61/673,561, filed on Jul. 19, 2012.

(51) Int. Cl.
*G01M 17/02* (2006.01)
*B60C 99/00* (2006.01)
*G01M 17/013* (2006.01)
*B60C 23/06* (2006.01)

(52) U.S. Cl.
CPC ........... *G01M 17/013* (2013.01); *B60C 23/062* (2013.01); *G01M 17/025* (2013.01)

(58) Field of Classification Search
None
See application file for complete search history.

(56) References Cited

U.S. PATENT DOCUMENTS

| | | | |
|---|---|---|---|
| 5,396,436 A * | 3/1995 | Parker et al. | 700/279 |
| 6,324,908 B1 * | 12/2001 | Colarelli et al. | 73/462 |
| 6,336,364 B1 | 1/2002 | Parker et al. | |
| 6,381,547 B1 * | 4/2002 | Heirtzler et al. | 702/39 |
| 6,386,031 B2 | 5/2002 | Colarelli, III et al. | |
| 6,389,895 B2 | 5/2002 | Colarelli, III et al. | |
| 6,393,911 B2 | 5/2002 | Colarelli, III et al. | |
| 6,397,675 B1 | 6/2002 | Colarelli, III et al. | |
| 6,405,591 B1 | 6/2002 | Colarelli, III et al. | |
| 6,422,074 B1 | 7/2002 | Colarelli, III et al. | |
| 6,435,027 B1 | 8/2002 | Colarelli, III et al. | |

(Continued)

OTHER PUBLICATIONS

Tire Technology International, "Soaking Up Sound", Oct. 2007, pp. 33-35.

(Continued)

*Primary Examiner* — John R Olszewski
*Assistant Examiner* — Gerrad A Foster
(74) *Attorney, Agent, or Firm* — Polster, Lieder, Woodruff & Lucchesi, L.C.

(57) ABSTRACT

A vehicle service or inspection system including a load roller for applying a radial load to a vehicle wheel assembly consisting of a tire mounted to a rim, with at least one sensor for acquiring measurements of acoustical energy generated by the wheel assembly during loaded rotational movement. The vehicle service or inspection system is configured with a programmed processor to evaluate the acquired measurements to provide a measure of tire road noise, identification of tire defects, and/or identification of sources of noise, vibrations, or acoustical energy on the tire surface such as tire flat spots, cupping, bubbles, embedded foreign objects, or other defects. The processor is further configured with software instructions to utilize the acquired measurements to provide a consumer with a figure of merit associated with the acoustics of the tire undergoing testing.

19 Claims, 6 Drawing Sheets

(56) References Cited

U.S. PATENT DOCUMENTS

| | | |
|---|---|---|
| 6,439,049 B2 | 8/2002 | Colarelli, III et al. |
| 6,609,424 B2 | 8/2003 | Colarelli, III et al. |
| 6,854,329 B2 | 2/2005 | Colarelli, III et al. |
| 2010/0139383 A1* | 6/2010 | Haswell et al. ............... 73/146 |

OTHER PUBLICATIONS

Yukawa, N., Tire Technology International 2007, "Noise Reduction Technology for Radial Passenger Car Tires", 2007, pp. 16-18.

* cited by examiner

SYSTEM AND METHOD FOR WHEEL ASSEMBLY ACOUSTICAL EVALUATION

CROSS-REFERENCE TO RELATED APPLICATIONS

The present application is related to, and claims priority from, U.S. Provisional Patent Application Ser. No. 61/673,561 filed on Jul. 19, 2012, and which is herein incorporated by reference.

STATEMENT REGARDING FEDERALLY SPONSORED RESEARCH

Not Applicable.

BACKGROUND OF THE INVENTION

The present application is directed general towards vehicle tire service and inspection systems, and in particular, towards vehicle tire service and inspection systems configured to measure and evaluate acoustical characteristics of a tire during rolling movement of the tire while in loaded contact with a surface.

A vehicle wheel assembly typically consists of a rigid wheel rim adapted for coupling to a wheel end of a vehicle axle, and an inflated tire mounted to the circumference of the wheel rim. When in use on a vehicle, a small portion of the inflated tire, known as the contact patch, is in direct contact with the road or other surface over which the vehicle is traveling. Rotation of the wheel assembly continually moves the tire surface into and out of the contact patch. So long as wheel spin or wheel skid is not present in the vehicle motion, the portion of the tire surface within the contact patch is stationary relative to the road surface.

The continual movement of the tire surface into and out of the contact patch gives rise to a number of events which generate acoustical energy, i.e., noise or mechanical vibrations which produce an audible sound as the wheel assembly rotates in loaded contact with a surface. For example, the weight of the vehicle and/or rotational acceleration typically deforms a tire from a uniformly round shape to one having a flattened portion at the contact patch and a slight bulge at the adjacent tire sidewalls. The continual deformation of the tire structure during rotational movement can generate acoustical energy or harmonic vibrations within the tire interior volume, depending upon the degree of deformation, the speed of deformation, the tire dimensions, and the material composition of the tire itself. For example, low rolling resistance tires, which typically are composed of stiffer rubber compositions, produce greater amounts of acoustical energy (i.e. noise) when compared to traditional tires. Similarly, winter or snow-traction tires often have rubber compositions which are optimized for cold-weather usage, and which can experience significant changes in stiffness in response to external temperatures, varying the audible noise produced by the tire. Another source of acoustical energy is the displacement of air from beneath the tire contact patch as it travels over the road or other surface, as well as the expulsion or other materials from within voids and recesses defined by a tread pattern on the tire surface. For example, when compared with the relatively smooth tread of traditional touring tires, such as shown in FIG. 1, off-road or all-terrain tires employ aggressive tread patterns having larger voids to facilitate traction, as shown in FIG. 2, which can result in increased levels of noise and acoustical energy generation.

Defects in the tire which alter the shape of the tire or the structure of the tire can give rise to harmonic or repeating pulses of acoustical energy as the tire rotates. Similarly, objects embedded in the tire surface or punctures in the tire material can produce pulses of acoustical energy which repeat for each complete rotation of the wheel assembly. Waves of acoustical energy traveling within the internal volume of the tire can constructively and destructively interfere, generating cavitation noise or vibrations as well.

Consumers are often concerned with the level of noise present in a traveling vehicle, and it is well known that at highway speeds, a large percentage of noise in a vehicle cabin is generated by the road noise associated with the vehicle tires. With many different models of tires available to a consumer, it would be useful to provide a consumer with a relative measure of how loud one model of tire may sound relative to another as a vehicle is traveling.

It would further be advantageous to provide a means by which consumer complaints related to excessive tire noise from a vehicle or even a particular vehicle wheel assembly can be evaluated to determine if the noise is due to a defect in the tire or is inherent to the tire itself.

Finally, it would be advantageous to provide a means by which tire acoustical energy (i.e., noise) can be utilized to identify possible defects in a tire assembly which may not otherwise be readily visible or detectable by conventional tire inspection processes.

BRIEF SUMMARY OF THE INVENTION

In one embodiment, the present invention provide a vehicle service or inspection system, and in particular, a tire service or inspection system having a load roller for applying a radial load to a vehicle wheel assembly consisting of a tire mounted to a rim, with at least one signal processing system including at least one receiver such as an acoustical sensor or vibration sensor for acquiring measurements of mechanical energy in the form of audible or inaudible vibrations generated by the wheel assembly during loaded rotational movement. The vehicle service or inspection system is further configured with a suitably programmed processor to evaluate the acquired measurements to provide a representation of tire noise, identification of tire defects, and/or identification of sources of distinct noises associated with the tire.

In an embodiment of the present invention, the vehicle service or inspection system is a vehicle wheel balancing system, and the processor is configured with suitable software instructions to identify tire flat spots, cupping, bubbles, embedded foreign objects, or other tire defects based on acoustical harmonics identified in the acquired measurements of acoustical energy. The processor is further configured with suitable software instructions to utilize the acquired measurements of acoustical energy to simulate tire noise at different vehicle speeds and on different road surfaces to provide a consumer with an acoustical figure of merit associated with the tire undergoing testing.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
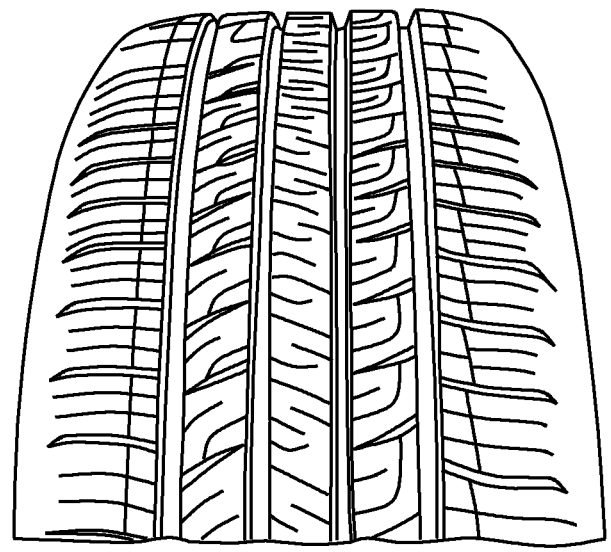
FIG. 1 is an illustration of a generic touring tire having a relatively smooth tread pattern.
Figure 2:
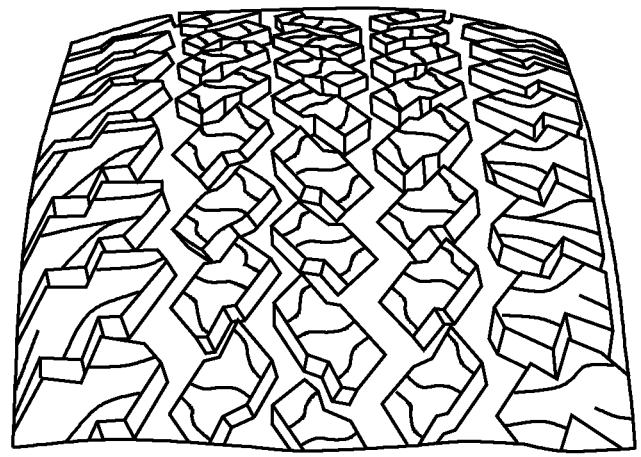
FIG. 2 is an illustration of a generic all-terrain tire having an aggressive tread pattern.
Figure 3:
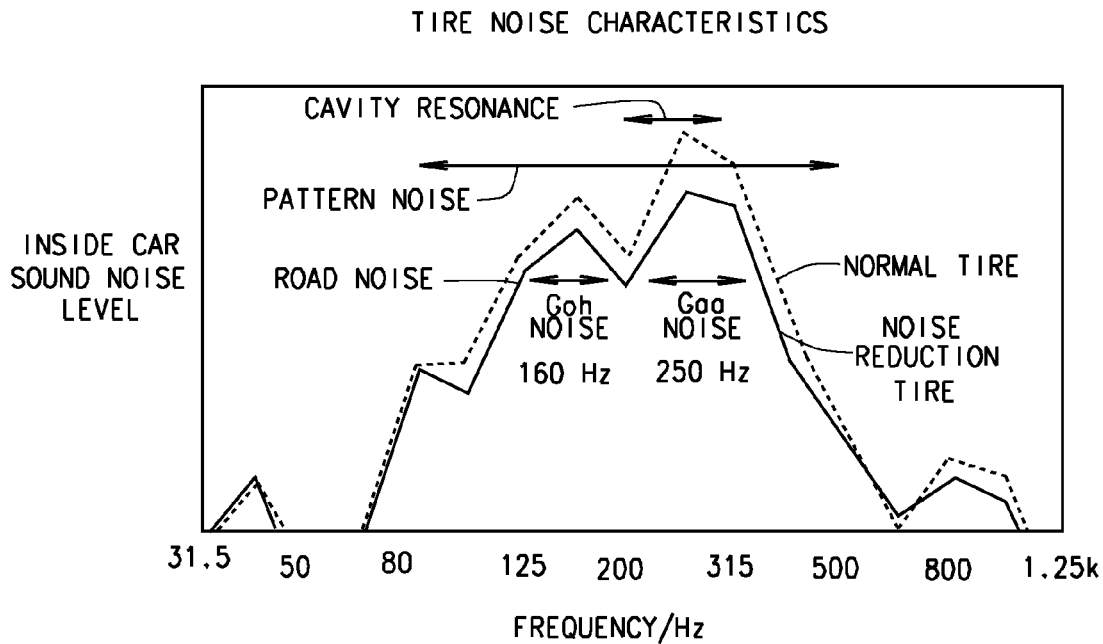
FIG. 3 is a prior art chart illustrating noise levels and sources associated with both a normal vehicle tire and a noise reduction vehicle tire.
Figure 4:
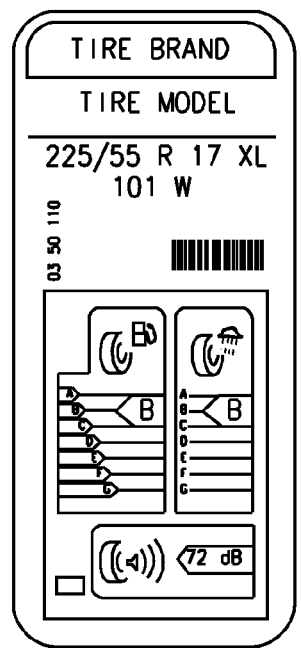
FIG. 4 is an exemplary prior art tire rating label for new tires, illustrating tire fuel economy, wet traction, and tire noise levels.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 5:
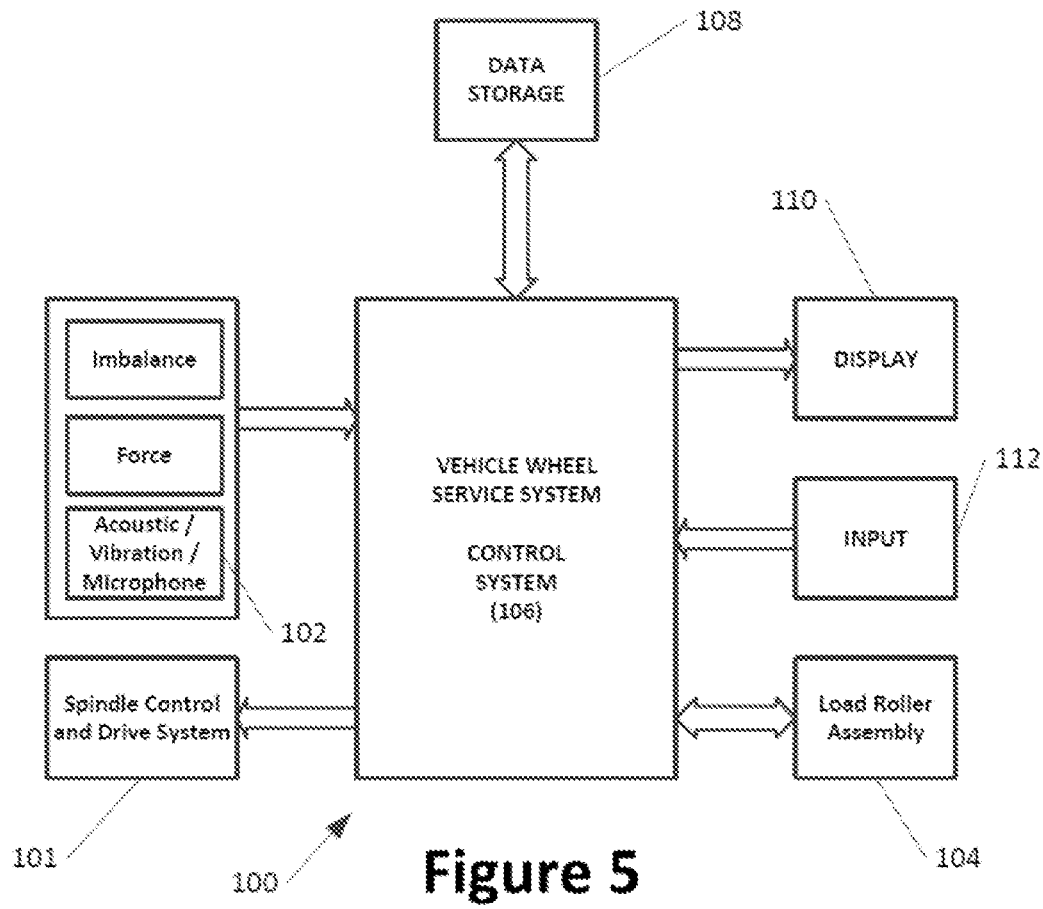
FIG. 5 is a block diagram of a vehicle wheel service system of the present disclosure, including an acoustic, vibration, or microphone-type sensor.
Figure 6:
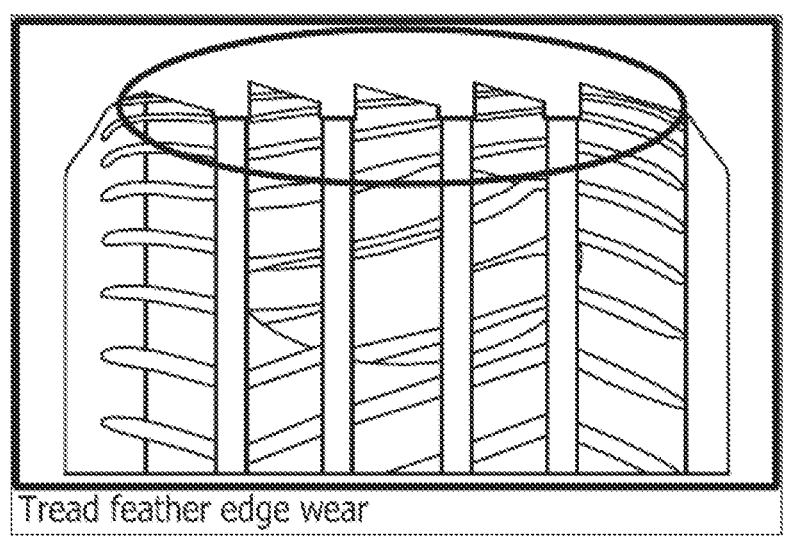
FIG. 6 is an illustration of tread feather edge wear which can produce noise.
Figure 7:
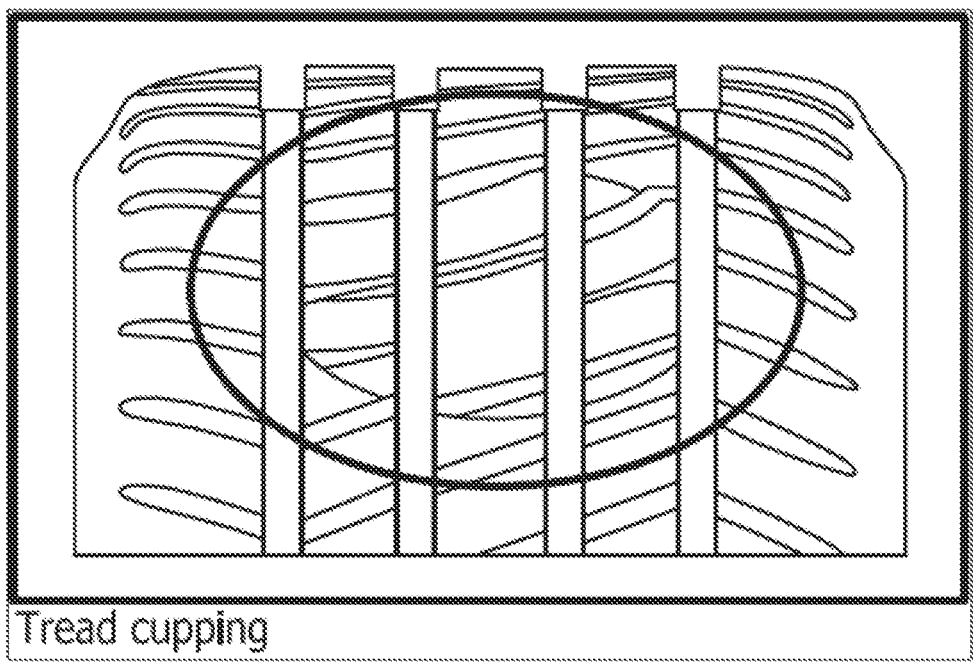
FIG. 7 is an illustration of tread cupping which can produce noise.
Figure 8:
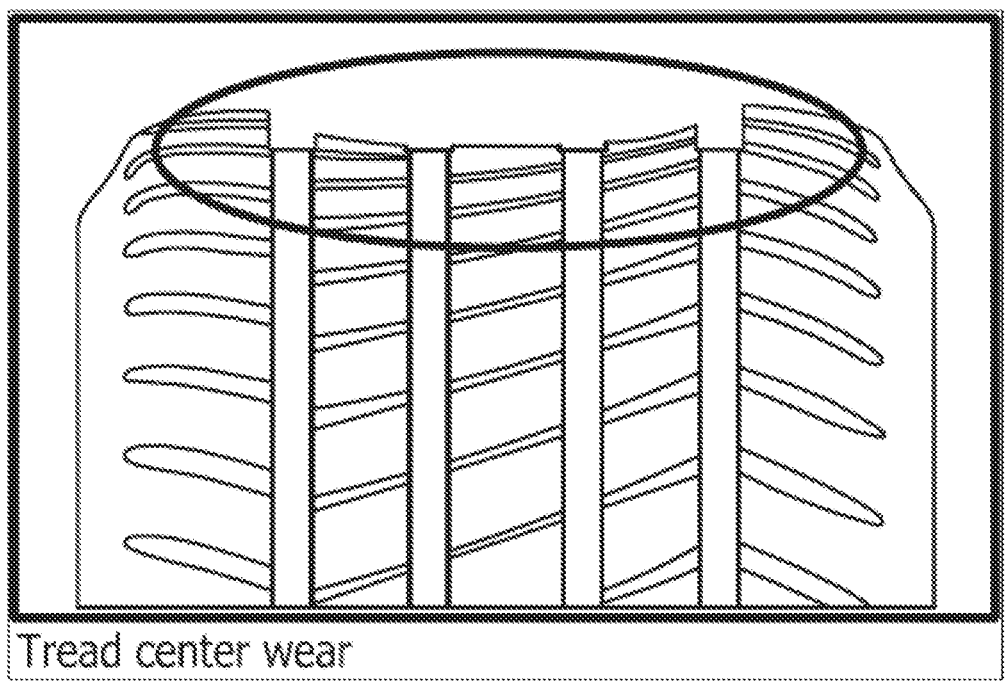
FIG. 8 is an illustration of tread center wear which can produce noise.
Figure 9:
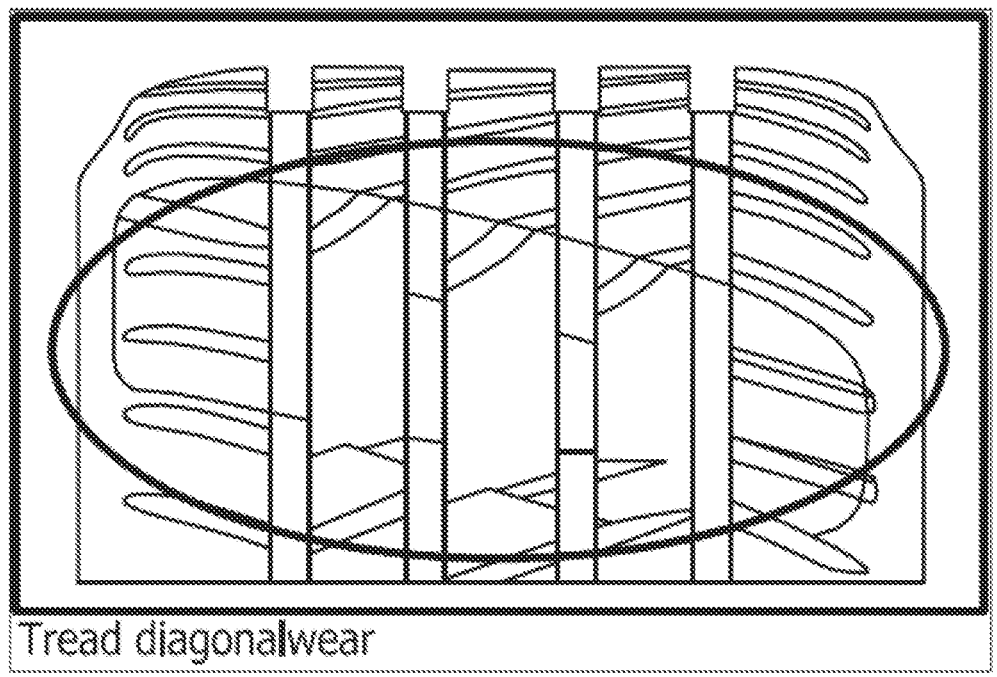
FIG. 9 is an illustration of tread diagonal edge wear which can produce noise.
Figure 10:
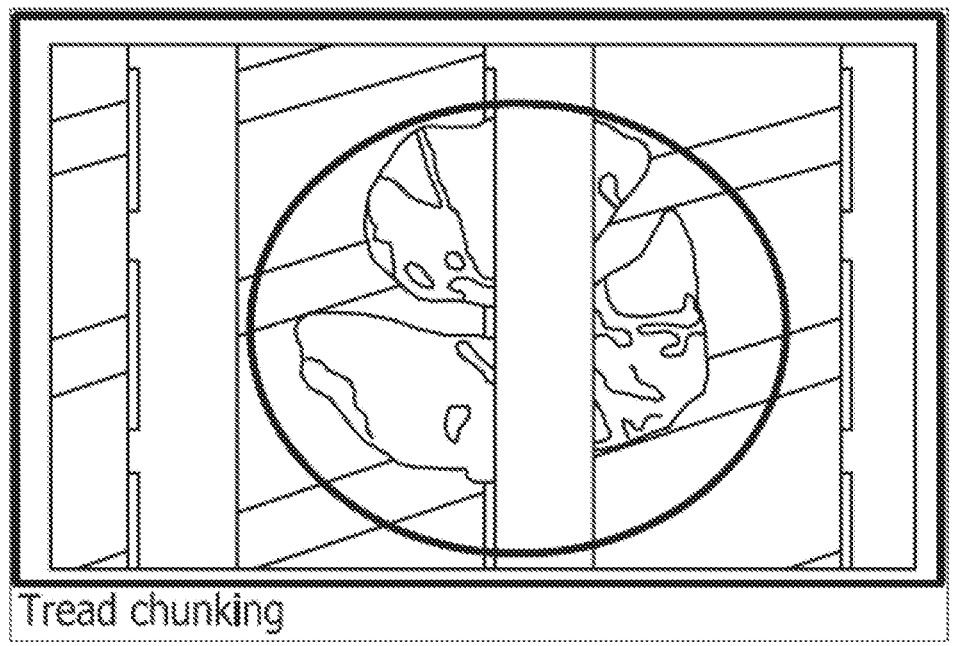
FIG. 10 is an illustration of tread chunking which can produce noise.
Figure 11:
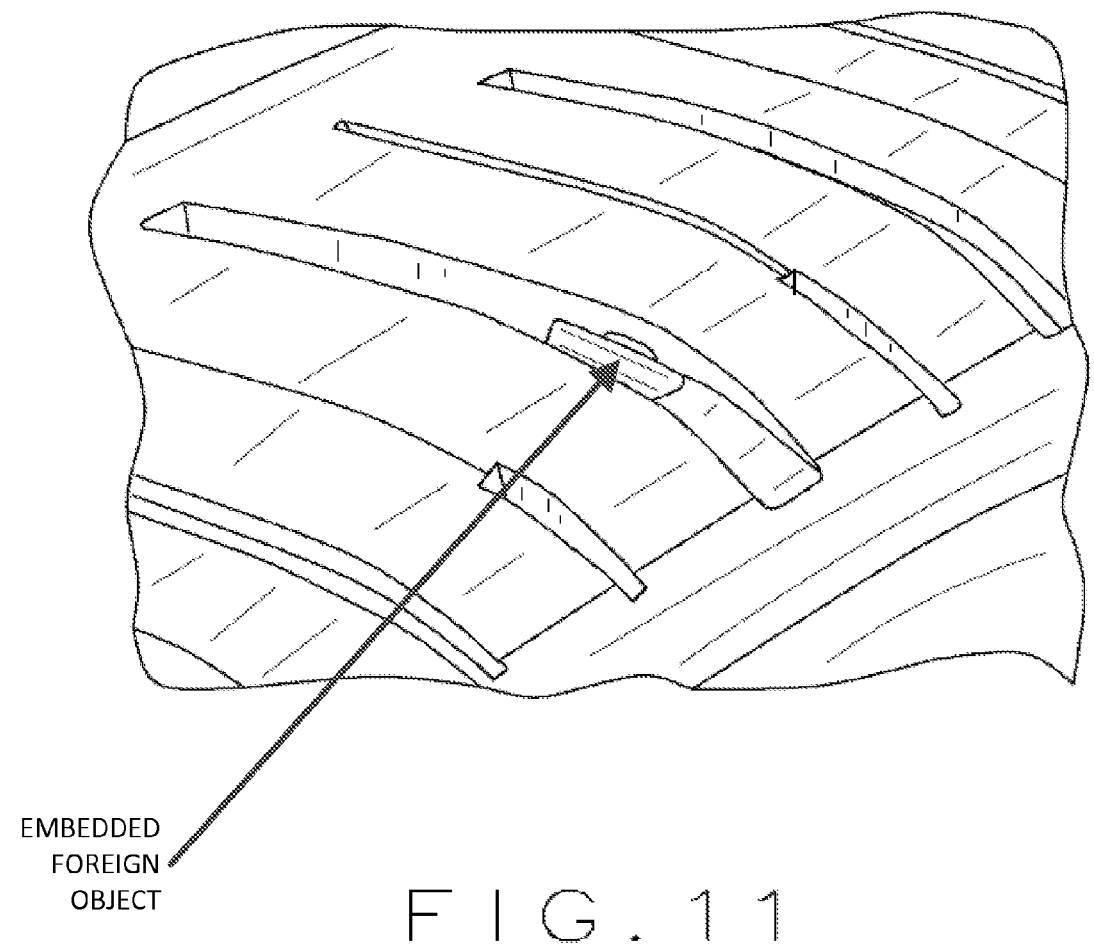
FIG. 11 is an illustration of an object embedded in a tread which can produce noise.

Vehicle wheel service systems 100, such as shown in FIG. 5, which are configured to utilize a load roller 104 to apply a generally radial load to a vehicle wheel assembly mounted on a driven spindle shaft 101 are well known in the vehicle service industry. Exemplary machines include wheel balancing systems and tire changing systems manufactured by the Hunter Engineering Company, and can be seen in U.S. Pat. Nos. 6,324,908; 6,336,364; 6,386,031; 6,389,895; 6,393,911; 6,397,675; 6,405,591; 6,422,074; 6,435,027; 6,439,049; 6,609,424; 6,799,460; and 6,854,329, each of which is herein incorporated by reference. In general, in order to rotationally drive the spindle shaft of the vehicle wheel service system 100 with the vehicle wheel assembly mounted there on, energy in the form of electrical current, is supplied to a drive motor operatively coupled to rotationally drive the spindle shaft under control of a suitably programmed processor 101, while a load is applied radially to the wheel assembly circumferential surface (i.e., tire tread) by an actuated load roller 104 or rolling surface. The engagement between the load roller/rolling surface and the wheel assembly defines a contact patch region on the tire outer surface in much the same manner as if the wheel assembly were mounted to a vehicle traveling on a roadway or other supporting surface.

In order to measure the acoustical energy produced by a tire during loaded rolling movement, the vehicle wheel service system 100 is further configured with at least one suitable acoustic sensor 102, such as a vibration sensor, an acoustical pickup, or a microphone disposed in operative proximity to at least the contact patch region of the tire at which the load is being applied. As the tire is rotationally driven by the vehicle service system 100 in loaded engagement with the load roller 104 or rolling surface, the acoustic sensor 102 acquires data which is representative of the acoustical energy produced by the tire deformation and/or interaction with the load roller or rolling surface 104 at the contact patch region. The acquired data is communicated to a suitably programmed processor within the vehicle service system control system 106 for analysis, storage in an accessible data storage 108, or display to an operator via a suitable display device 110. The accessible data storage 108 may be either a local memory associated with the vehicle service system 100, or a remote data storage accessible via a suitable communication network.

Those of ordinary skill in the art will recognize that a typical vehicle service environment in which a vehicle wheel service system 100 may be operated is, in itself, inherently full of vibrations and noise. Accordingly, it will be understood that additional sensors, such as additional vibration sensors, acoustical pickups, and/or microphones may be employed by a vehicle service system 100, together with a suitable configured processor 106, to enable the vehicle wheel service system to process multiple signals so as to effectively cancel out or reduce interference from environmental vibrations and noises not generated by the tire during rotational movement under loaded conditions.

By storing measurements of acoustical energy (i.e., tire noise) associated with different vehicle wheel assemblies, a vehicle wheel service system 100 may be configured to provide an operator with a visual or numerical representation of the relative loudness for each wheel assembly, allowing an operator to quickly identify which wheel assembly (or tire) will be the quietest from an available collection of wheel assemblies, or which wheel assembly on a vehicle may be generating excessive or undesired noise when traveling.

In addition to providing an operator with a visual or numerical representative of relative audible loudness via the display 110, the vehicle wheel service system 100 may be configured to store the data in a suitable electronic memory or accessible data store 108, such as in the form of a database entry. By associating the relative measures of audible loudness, vibrations, or acoustical data with specific information identifying the accompanying tire parameters (i.e., brand, model, size, inflation, etc.) which may be obtained automatically from information stored or marked on the tire by RFID or OCR sensors, or entered manually by an operator, the database can be populated to allow for a vehicle service shop to quantify the differences between various tires, and thus provide valuable information to customers regarding the relative acoustical properties of different tires and different tire conditions. If a unique tire identification system is employed, the database can be further utilized to track changes in the acoustical properties of a specific tire over an extended time, which may be beneficial to aid in the determination of when a replacement tire is required. As a tire wears, the tread pattern and/or composition of the exposed tread material may change, altering the acoustical signature of the tire. By utilizing suitable software instructions, the control system 106 can be configured to identify trends in the alteration of the acoustical signature, providing predictions as to remaining tire useful life and/or future noise levels.

Those of ordinary skill in the art will recognize that the measurements of vibrations, noise, or acoustical energy may be acquired as either analog or digital data. In one embodiment, the data is acquired as digital data, sampled at discrete intervals during at least one complete revolution of the vehicle wheel assembly under a loaded condition and at a selected speed of revolution. Preferably, data sampling is synchronized with data from a rotary encoder associated with the rotating spindle shaft on which the vehicle wheel assembly is mounted, such that each discrete data sample, can be identified with a discrete rotational position of the vehicle wheel (and correspondingly with, a specific region of the tire in contact with the load roller or rolling surface).

Acquired samples of vibration, noise or acoustical energy are processed by a suitably configured and programmed processor 106 in the vehicle service system 100, such as a digital signal processor, using known signal processing techniques, such as Discrete Fourier Transforms (DFTs), to identify once per revolution noises or variances, as well as to analyze a wide range of the acoustic spectrum and identify the dominant frequencies. Identification of once-per-revolution noises or variances and dominant frequencies can assist in the diagnosis of problems or defects in the tire. These may include tire uniformity issues, such as flat spots, bubbles, cupping, etc., as well as the presence of specific tire damage (broken belts internally within the tire) or embedded foreign objects, such as shown in FIGS. 6-11. By associating discrete samples of noise or acoustical energy with corresponding rotational positions of the tire, the vehicle service system 100 can direct an operator, via display 110, to inspect a particular region of the tire surface for damage or defects in response to an identified noise or acoustical variance at that location.

Once processed, the acquired samples of noise or acoustical energy may be utilized to allow an operator to simulate what the tire road noise would sound like to an operator at higher or lower vehicle speeds (i.e., the acquired samples can be played back to the operator over a speaker at a rate corresponding to a selected vehicle speed chose by the operator through an input device 112). The processed samples may also provide a figure of merit for how "loud" one tire will be going down a road compared to another one (or to an average of many tires). Similarly, within a set of tires to be installed on a vehicle, the processed samples can be utilized to provide a means to identify a tire having an excessive variance in noise.

The present disclosure can be embodied in-part in the form of computer-implemented processes and apparatuses for practicing those processes. The present disclosure can also be embodied in-part in the form of computer program code containing instructions embodied in tangible media, or another computer readable storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A vehicle wheel service system having a rotating spindle shaft for receiving a vehicle wheel assembly consisting of a wheel rim and tire mounted there on; the vehicle wheel service system further having a drive motor for rotationally driving the rotating shaft under control of a processing system and a controlled load roller for applying a generally radial load to an outer circumferential surface of the vehicle wheel assembly during rotation, comprising:

wherein the processing system is further configured with a set of software instruction to obtain a measure of tire deformation acoustical energy, said tire deformation acoustical energy generated by the wheel assembly during rotational movement while said tire is continuously deformed under an applied radial load from the controlled load roller; and wherein the processing system is further configured with a set of software instructions to process said obtained measure of tire deformation acoustical energy to identify tire characteristics consisting of a relative tire loudness level, a measure of road noise, a surface non-uniformity, a representation of tire tread wear, and an inflation condition.

2. The vehicle wheel service system of claim 1 wherein said measure of tire deformation acoustical energy is retrieved from an accessible data storage.

3. The vehicle wheel service system of claim 1 wherein said one or more tire characteristics further consist of an indication of the presence of one or more tire defects or damaged regions.

4. The vehicle wheel service system of claim 1 wherein said processing system is configured with a set of software instructions to provide a visual display of said measure of tire deformation acoustical energy to an operator.

5. The vehicle wheel service system of claim 4 wherein said visual display is a numerical value.

6. The vehicle wheel service system of claim 4 wherein said visual display is a graphical representation.

7. The vehicle wheel service system of claim 1 wherein said processing system is configured with a set of software instructions to store said measure of tire deformation acoustical energy in an accessible data storage, together with at least one associated tire parameter selected from a set of tire parameters including tire brand, tire model, tire dimensions, tire inflation pressure, tire wear, tire service age, and tire placement location on a vehicle.

8. The vehicle wheel service system of claim 1 wherein said processing system is configured with a set of software instructions to compare said measure of tire deformation acoustical energy with one or more measurements of tire deformation acoustical energy stored in an accessible data storage, and to provide an operator with a visual display associated with said comparison.

9. The vehicle wheel service system of claim 8 wherein said one or more stored measurements of tire deformation acoustical energy are each associated with a different vehicle wheel assembly or tire.

10. The vehicle wheel service system of claim 8 wherein said one or more stored measurements of tire deformation acoustical energy are each associated with said vehicle wheel assembly at different points in time, and wherein said visual display associated with said comparison represents a change in tread wear for said vehicle wheel assembly tire.

11. The vehicle wheel service system of claim 1 wherein said processing system is further configured to obtain samples of said measure of tire deformation acoustical energy over a period of at least one full revolution of said vehicle wheel assembly, and wherein each of said samples is associated with a location about the circumference of the wheel assembly by synchronization of said sampling with said wheel assembly rotational movement.

12. The vehicle wheel service system of claim 11 wherein said processing system is configured to identify once-per-revolution variances in said samples of said measure of tire deformation acoustical energy, and to provide an operator with an identification of a corresponding location about said wheel assembly circumference for inspection.

13. The vehicle wheel service system of claim 1 wherein at least a portion of said tire deformation acoustical energy generated by the tire during rotational movement is within a range of human hearing.

14. The vehicle wheel service system of claim 1 wherein a portion of said tire deformation acoustical energy generated by the tire during rotational movement is outside a range of human hearing.

15. The vehicle wheel service system of claim 1 further including an acoustic sensor disposed in operative proximity to a region of said tire at which said load is applied.

16. A method for providing a representation of tire deformation acoustical energy generated during loaded rotational movement by a vehicle wheel assembly consisting of a tire mounted to a wheel rim; comprising:

mounting the vehicle wheel assembly to a driven spindle shaft of a vehicle wheel service system;

applying a generally radial load to an outer circumference of the vehicle wheel assembly during driven rotation of the spindle shaft and vehicle wheel assembly;

acquiring data representative of tire deformation acoustical energy generated during the driven rotation of the vehicle wheel assembly while said tire is deformed under the applied load;

processing said obtained data to produce a representation of the tire deformation acoustical energy generated by the vehicle wheel assembly; and wherein processing said obtained data identifies a tire characteristic of the vehicle wheel assembly, said characteristic consisting of a measure of road noise, an identified surface non-uniformity, a measure of surface wear, the presence of an embedded foreign object, the presence of tire structure damage, or an identification of a tire inflation condition.

17. The method of claim 16 further including the step of providing a visual display of said representation of tire deformation acoustical energy to an operator.

18. The method of claim 16 further including the step of storing said representation of tire deformation acoustical energy in an accessible data storage, together with at least one associated tire parameter.

19. The method of claim 16 where the data is acquired over at least one complete revolution of said vehicle wheel assembly.

* * * * *